United States Patent
Wei et al.

(10) Patent No.: US 12,470,531 B2
(45) Date of Patent: Nov. 11, 2025

(54) INTERACTIVE AUTHENTICATION METHOD, SYSTEM, COMPUTER DEVICE, AND NON-VOLATILE READABLE STORAGE MEDIUM

(71) Applicants: Beijing BOE Technology Development Co., Ltd., Beijing (CN); BOE Technology Group Co., Ltd., Beijing (CN)

(72) Inventors: Xiangye Wei, Beijing (CN); Yiming Bai, Beijing (CN); Liming Xiu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 325 days.

(21) Appl. No.: 18/266,690

(22) PCT Filed: Dec. 24, 2020

(86) PCT No.: PCT/CN2020/139027
§ 371 (c)(1),
(2) Date: Jun. 12, 2023

(87) PCT Pub. No.: WO2022/133904
PCT Pub. Date: Jun. 30, 2022

(65) Prior Publication Data
US 2024/0048540 A1    Feb. 8, 2024

(51) Int. Cl.
*H04L 9/40*  (2022.01)
*H04L 9/32*  (2006.01)

(52) U.S. Cl.
CPC ........ *H04L 63/0457* (2013.01); *H04L 9/3278* (2013.01)

(58) Field of Classification Search
CPC . H04L 63/0457; H04L 9/0866; H04L 9/3278; H04W 12/04
See application file for complete search history.

(56) References Cited

U.S. PATENT DOCUMENTS

2013/0151852 A1*  6/2013  Bian ............... H04W 12/06
                                               713/168
2016/0110571 A1*  4/2016  Jung ............... H04L 9/3263
                                               340/10.1
(Continued)

FOREIGN PATENT DOCUMENTS

CN       102142961 A    8/2011
CN       102421096 A    4/2012
(Continued)

OTHER PUBLICATIONS

PCT/CN2020/139027 international search report.
CN202080003617.2 first office action dated May 31, 2024.

*Primary Examiner* — Gary S Gracia
(74) *Attorney, Agent, or Firm* — IPro, PLLC

(57) ABSTRACT

Provided is an interactive authentication method, applicable to a transmitter. The transmitter is communicatively connected to a receiver. The authentication method includes: generating a first challenge and transmitting the first challenge to the receiver; receiving a response from the receiver, wherein the response comprises first identity authentication information and a second challenge, the first identity authentication information and the second challenge being encrypted using a first identity authentication key; generating, based on the first challenge, a second identity authentication key and second identity authentication information; and decrypting the first identity authentication information using the second identity authentication key, and performing identity authentication by matching the decrypted first identity authentication information with the second identity authentication information.

16 Claims, 14 Drawing Sheets

(56) References Cited

U.S. PATENT DOCUMENTS

| | | | |
|---|---|---|---|
| 2017/0272945 A1* | 9/2017 | Link, II | H04W 12/041 |
| 2021/0242874 A1* | 8/2021 | Ma | H03L 7/18 |
| 2021/0250170 A1* | 8/2021 | Wu | H04L 9/0625 |
| 2021/0356985 A1* | 11/2021 | Wei | H03L 1/00 |
| 2022/0029627 A1* | 1/2022 | Wei | H03L 7/24 |
| 2022/0045703 A1* | 2/2022 | Wei | G06F 1/10 |
| 2022/0052703 A1* | 2/2022 | Wei | H03L 7/1974 |
| 2022/0173739 A1* | 6/2022 | Wei | G06F 1/12 |
| 2022/0180001 A1* | 6/2022 | Wei | G06F 1/08 |
| 2022/0214356 A1* | 7/2022 | Henikoff | C12Q 1/6804 |
| 2022/0311428 A1* | 9/2022 | Wei | G06F 7/501 |
| 2022/0311529 A1* | 9/2022 | Wei | H04W 56/00 |
| 2022/0311606 A1* | 9/2022 | Bai | H04L 9/14 |
| 2022/0345136 A1* | 10/2022 | Qi | H03L 7/083 |
| 2022/0376687 A1* | 11/2022 | Wei | H03K 3/017 |
| 2022/0407507 A1* | 12/2022 | Wei | H03K 5/249 |
| 2023/0070146 A1* | 3/2023 | Wei | H04L 9/0866 |
| 2023/0394137 A1* | 12/2023 | Wei | H04L 9/32 |
| 2024/0048540 A1* | 2/2024 | Wei | H04L 63/0457 |
| 2024/0089003 A1* | 3/2024 | Wei | H04B 10/27 |
| 2024/0171411 A1* | 5/2024 | Wei | H04L 9/3278 |
| 2024/0184531 A1* | 6/2024 | Wei | G06F 7/58 |

FOREIGN PATENT DOCUMENTS

| | | |
|---|---|---|
| CN | 102457844 A | 5/2012 |
| CN | 103118363 A | 5/2013 |
| CN | 104782076 A | 7/2015 |
| CN | 109861818 A | 6/2019 |
| CN | 110048856 A | 7/2019 |
| CN | 111740995 A | 10/2020 |
| KR | 20200017038 A | 2/2020 |
| WO | 2017009378 A1 | 1/2017 |

* cited by examiner

INTERACTIVE AUTHENTICATION METHOD, SYSTEM, COMPUTER DEVICE, AND NON-VOLATILE READABLE STORAGE MEDIUM

CROSS-REFERENCE TO RELATED APPLICATION

The present disclosure is a U.S. national stage of international application No. PCT/CN2020/139027, filed on Dec. 24, 2020, the content of which is herein incorporated by reference in its entirety.

TECHNICAL FIELD

The present disclosure relates to the field of communication technologies, and in particular, relates to an interactive authentication method, a system, a computer device, and a non-volatile readable storage medium.

BACKGROUND OF THE INVENTION

With the rapid development of the Internet of things, the number of terminal devices increases exponentially. In the future, more than fifty percent of communications will come from machine-to-machine (M2M), and intelligent devices need to perform identity authentication on communication requests from other devices.

SUMMARY OF THE INVENTION

Embodiments of the present disclosure provide an interactive authentication method, a system, a computer device, and a non-volatile readable storage medium.

According to some embodiments of the present disclosure, an interactive authentication method is provided. The interactive authentication method is applicable to a transmitter, wherein the transmitter is communicatively connected to a receiver. The interactive authentication method includes: generating a first challenge and transmitting the first challenge to the receiver; receiving a response from the receiver, wherein the response includes first identity authentication information and a second challenge, the first identity authentication information and the second challenge being encrypted using a first identity authentication key; generating, based on the first challenge, a second identity authentication key and second identity authentication information; and decrypting the first identity authentication information using the second identity authentication key, and performing identity authentication by matching the decrypted first identity authentication information with the second identity authentication information.

In some embodiments, the first identity authentication key and the first identity authentication information are generated by the receiver based on the first challenge using a first encryption circuit which employs a biased time-average-frequency direct period synthesis and a physical unclonable function.

In some embodiments, the second identity authentication key and the second identity authentication information are generated by the transmitter based on the first challenge using a second encryption circuit which employs a biased time-average-frequency direct period synthesis and a physical unclonable function, wherein properties of the first encryption circuit and the second encryption circuit are maintained consistent.

In some embodiments, decrypting the first identity authentication information using the second identity authentication key and performing the identity authentication by matching the decrypted first identity authentication information with the second identity authentication information includes: in response to the decrypted first identity authentication information being the same as the second identity authentication information, determining that the identity authentication of the receiver is successful and decrypting the second challenge; or in response to the decrypted first identity authentication information being different from the second identity authentication information, determining that the identity authentication of the receiver fails and stopping communication between the transmitter and the receiver.

In some embodiments, determining that the identity authentication of the receiver is successful and decrypting the second challenge, in response to the decrypted first identity authentication information being the same as the second identity authentication information includes: generating a first information key based on the decrypted second challenge; acquiring encrypted information by encrypting information for transmission using the first information key; and transmitting the encrypted information to the receiver.

In some embodiments, acquiring the encrypted information by encrypting the information for transmission using the first information key includes: encrypting the information for transmission using the first information key according to a logical operation by means of stream encryption.

In some embodiments, the interactive authentication method further includes: receiving first digest information from the receiver, wherein the first digest information is acquired by processing a second information key generated by the second challenge using a pre-defined algorithm by the receiver; and acquiring second digest information by processing the first information key using a pre-defined algorithm, and performing decoding authentication by matching the first digest information with the second digest information.

In some embodiments, performing the decoding authentication by matching the first digest information with the second digest information includes: in response to the first digest information being the same as the second digest information, determining that the decoding authentication is successful and stopping communication by transmitting an acknowledgment signal to the receiver; or in response to the first digest information being different from the second digest information, determining that decoding authentication fails.

According to some embodiments of the present disclosure, an interactive authentication method is provided. The method is applicable to a receiver, wherein the receiver is communicatively connected to a transmitter. The interactive authentication method includes: receiving a first challenge from the transmitter; generating, based on the first challenge, a first identity authentication key, first identity authentication information, and a second challenge; encrypting, using the first identity authentication key, the first identity authentication information and the second challenge; and transmitting the encrypted first identity authentication information and the encrypted second challenge as a response to the transmitter for identity authentication.

In some embodiments, the interactive authentication method further includes: receiving encrypted information from the transmitter, wherein the encrypted information is acquired by the transmitter by encrypting information for transmission based on a first information key, the first information key being generated by the transmitter based on the second challenge; generating a second information key based on the second challenge; and acquiring the information for transmission by decrypting the encrypted information using the second information key.

In some embodiments, acquiring the information for transmission by decrypting the encrypted information using the second information key includes: encrypting the information for transmission using the second information key according to a logical operation by means of stream encryption.

In some embodiments, the interactive authentication method further includes: acquiring first digest information by processing the second information key using a predefined algorithm and transmitting the first digest information to the transmitter for decoding authentication.

In some embodiments, the interactive authentication method further includes: stopping communication by receiving an acknowledgment signal from the transmitter.

According to some embodiments of the present disclosure, an interactive authentication system is provided. The system includes: a transmitter and a receiver. The transmitter is configured to generate a first challenge and transmit the first challenge to the receiver. The receiver is configured to receive the first challenge transmitted by the transmitter; generate, based on the first challenge, a first identity authentication key, first identity authentication information, and a second challenge; encrypt, using the first identity authentication key, the first identity authentication information and the second challenge; and transmit the encrypted first identity authentication information and the encrypted second challenge as a response to the transmitter. The transmitter is further configured to generate, based on the first challenge, a second identity authentication key and second identity authentication information; decrypt the first identity authentication information using the second identity authentication key; and perform authentication by matching the decrypted first identity authentication information with the second identity authentication information.

According to some embodiments of the present disclosure, a computer device is provided. The computer device includes a processor and a memory, wherein the memory stores one or more computer programs. The one or more computer programs, when loaded and run by the processor, cause the processor to perform: generating a first challenge and transmitting the first challenge to the receiver; receiving a response transmitted by the receiver, wherein the response includes first identity authentication information and a second challenge, the first identity authentication information and the second challenge being encrypted by a first identity authentication key; generating, based on the first challenge, a second identity authentication key and second identity authentication information; and decrypting the first identity authentication information using the second identity authentication key, and performing identity authentication by matching the decrypted first identity authentication information with the second identity authentication information.

According to some embodiments of the present disclosure, a non-volatile computer-readable storage medium is provided. The non-volatile computer-readable storage medium stores one or more computer programs. The one or more computer programs, when loaded and run by one or more processors, cause then one or more processors to perform: generating a first challenge and transmitting the first challenge to the receiver; receiving a response transmitted by the receiver, wherein the response includes first identity authentication information and a second challenge, the first identity authentication information and the second challenge being encrypted by a first identity authentication key; generating, based on the first challenge, a second identity authentication key and second identity authentication information; and decrypting the first identity authentication information using the second identity authentication key, and performing identity authentication by matching the decrypted first identity authentication information with the second identity authentication information.

Additional aspects and advantages of the embodiments of the present disclosure will be partly described hereinafter and will become apparent from the following description, or the practice of the present disclosure.

BRIEF DESCRIPTION OF DRAWINGS

The foregoing and/or additional aspects and advantages of the present disclosure will become apparent and readily understood from the description of the embodiments in conjunction with the accompanying drawings hereinafter, wherein.

DETAILED DESCRIPTION

Figure 1:
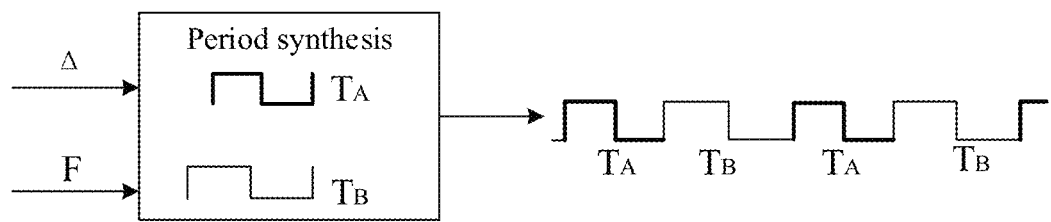
FIG. 1 is an exemplary schematic diagram of a time average frequency of some embodiments of the present disclosure.

Embodiments of the present disclosure are described hereinafter in further detail. Examples of the embodiments are illustrated in the accompanying drawings, wherein the same or similar reference numerals from beginning to end indicate the same or similar components or components having the same or similar functions. The embodiments described hereinafter with reference to the accompanying drawings are exemplary and are intended only to explain the present disclosure and are not intended to construe any limitation to the present disclosure.

In the description of the present disclosure, it should be understood that orientation or positional relations indicated by the terms "center," "longitudinal," "transverse," "length," "width," "thickness," "up," "down," "front," "back," "left," "right," "vertical," "horizontal," "top," "bottom," "inside," "outside," "clockwise," "counterclockwise," and the like are orientation or positional relationships based on the accompanying drawings, and are intended only to facilitate and simplify the description of the present disclosure and are not intended to indicate or imply that the device or element referred to must be of a particular orientation, constructed and operated in a particular orientation, and therefore are not intended to construe any limitation to the present disclosure. In addition, the terms "first" and "second" are only used for descriptive purposes and cannot be understood as indicating or implying relative importance or implicitly specifying the number of indicated technical features. Thus, the features limited by "first" and "second" may explicitly or implicitly include one or more of the features. In the description of the present disclosure, the term "a plurality of" refers to two or more, unless expressly defined otherwise.

In the present disclosure, it should be noted that unless otherwise defined and limited, the terms "mount," "connect," "contact," and the like should be broadly understood, such as fixed connections, detachable connections, or integration; mechanical connections or electrical connections; direct connections or indirect connections through an intermediate medium; or internal communications within two components or interaction between two components. For those skilled in the art, the specific meanings of the above terms in the present disclosure can be understood according to the specific circumstances.

When the number of devices in the network reaches a threshold, identifications (IDs) are stored in a non-volatile memory (NVM), and such devices are capable of stealing internal information by various means. That is, the IDs of other devices in the network are likely to be leaked indirectly. With the stolen IDs, the attackers are capable of fraudulently using the IDs to communicate with the device, and the security is poor.

In addition, when the number of devices in the network reaches the threshold, each of the devices needs to save the IDs of all devices in the network. When the number of saved IDs reaches a threshold, the maintenance and management of the entire network will become extremely complex and inefficient. For example, where a device modifies its ID, all the devices in the network need to be notified. In addition, the current IDs need special protocols to complete authentication with others. That is, different functional circuits are required to complete authentication and data encryption, which greatly increases the complexity of the system.

An interactive authentication method, an apparatus, a system, a computer device, and a readable storage medium according to some embodiments of the present disclosure are described hereinafter with reference to the accompanying drawings.

The interactive authentication method according to the present disclosure is a combination of authentication and data encryption, and both keys and IDs are generated by hardware TDP. The TDP technology is interpreted as a combination of a time-average-frequency direct period synthesis (TAF-DPS) and a physical unclonable function (PUF). The PUF is a "digital fingerprint," and is used as a unique ID for semiconductor devices (such as microprocessors). The ID generated by hardware is related to the hardware, is generated only upon power-up and operation, and is non-migratable. Therefore, the ID has the advantages of high uniqueness, privacy, and security, and does not need to be stored, such that the security of the system is greatly improved. In addition, the method has characteristics such as small area, low power consumption, and easy integration, and is suitable for a solution for a field-programmable gate array (FPGA) due to its remarkable reconfigurability.

It should be understood that, as illustrated in FIG. 1, the time-average-frequency (TAF) is a pulse mainly formed by multiple periods to satisfy an effect of an average frequency over a period of time. The TAF is described as:

$$T_{TAF}=(1-R)T_A+rT_B$$

$T_{TAF}$ represents an output pulse of the TAF-DPS. $T_A$ and $T_B$ are two periods, r represents a probability of occurrence of $T_B$, and 1−r represents a probability of occurrence of $T_A$.

Figure 2:
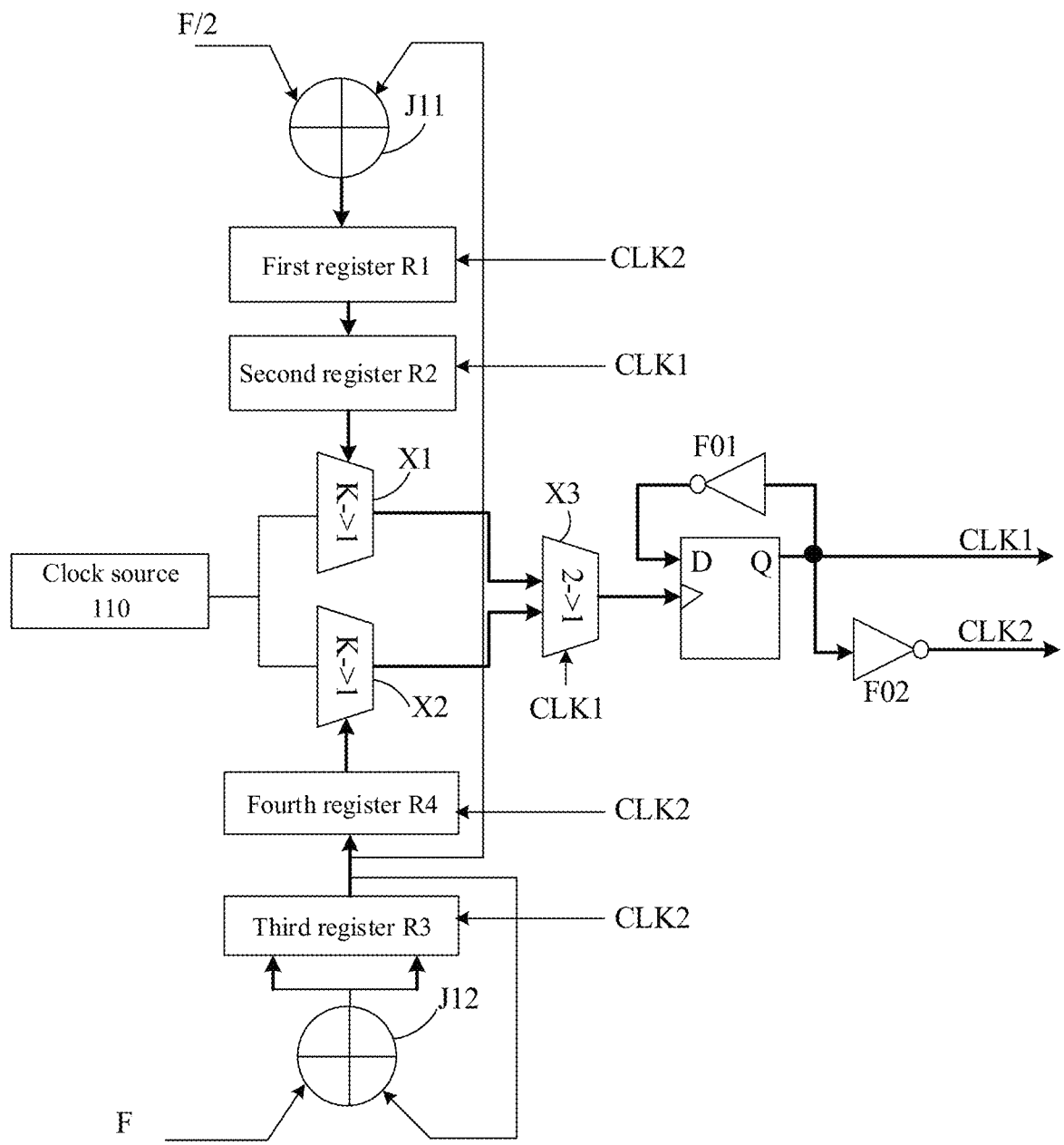
FIG. 2 is a schematic structural diagram of a circuit of an exemplary clock generator of some embodiments of the present disclosure.

Referring to FIG. 2, a clock generator (TAF-DPS) includes a first register R1, a second register R2, a third register R3, a fourth register R4, a first adder J11, a second adder J12, a first selector X1, a second selector X2, a third selector X3, a flip-flop D, a first inverter F01, and a second inverter F02.

FIG. 2 is a schematic structural diagram of a circuit of an exemplary clock generator (such as the TAF-DPS) of some embodiments of the present disclosure. The TAF-DPS is mainly configured to implement the working principle of the TAF and controls to generate pulses of any frequency by a control word F with the following relation.

$$T_A = 1*\Delta, \ B = (1+1)*\Delta$$

$$T_{TAF} = F*\Delta = (1+r)*\Delta = 1*\Delta - 1*r*\Delta + 1*r*\Delta + r*\Delta =$$
$$(1-r)*1*\Delta + r*(1+1)*\Delta = (1-r)*T_A + r*T_B$$

F represents the control word of the TAF-DPS and satisfies F=I+r, I represents an integer, r represents a fractional number between 0 and 1, and Δ represents a phase difference between K input adjacent pulses.

Figure 3:
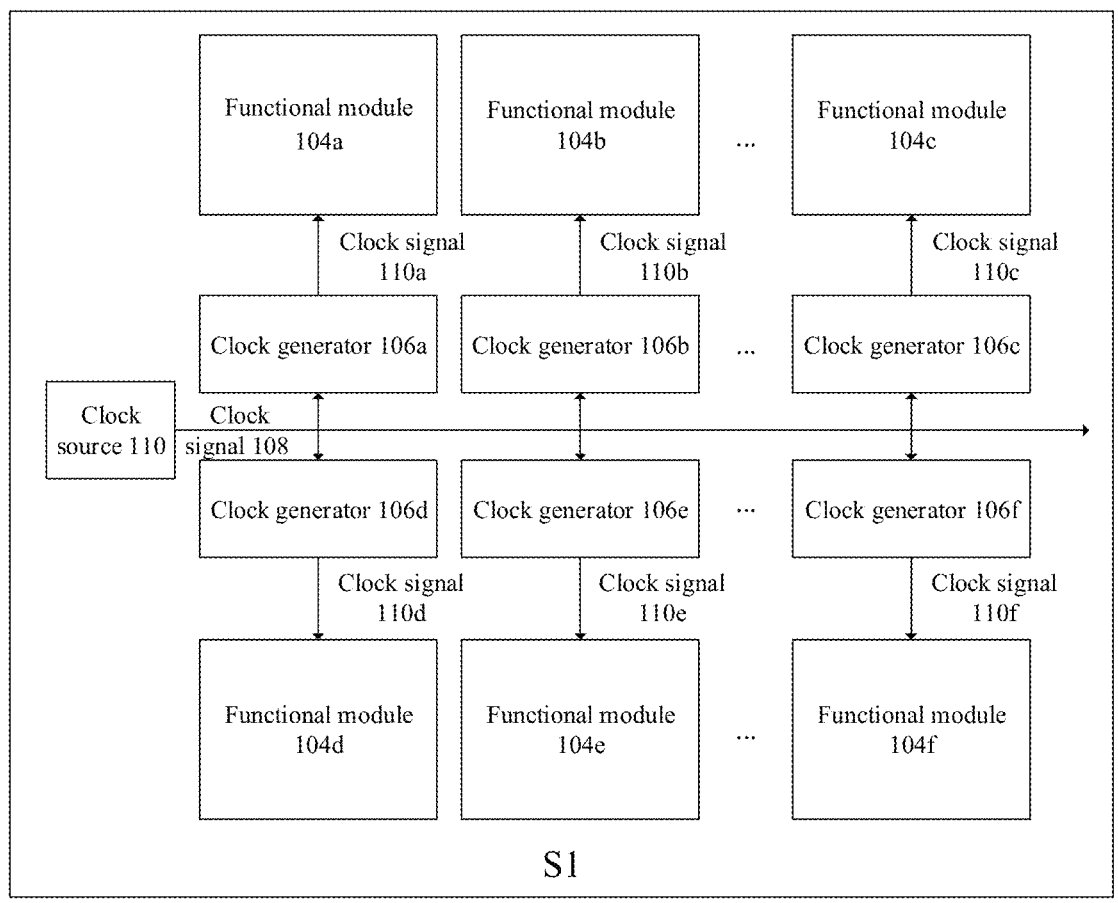
FIG. 3 is a schematic structural diagram of an exemplary integrated circuit of some embodiments of the present disclosure.

Assuming that a clock signal transmitted by the clock signal 108 to any clock generator TAF-DPS is CLK, and clock delay of the clock signal 108 transmitted to the TAF-DPS is ψ compared with an ideal clock $CLK_0$ of the TAF-DPS, then the clock signal 108 transmitted to the TAF-DPS is described as follows:

$$CLK=CLK_0+\psi$$

ψ represents typically a time delay caused by the long transmission and load of a line. Assuming that there are n functional modules in an integrated circuit S1 (referring to FIG. 3), then clock signals transmitted by clock signals to each TAF-DPS are described as follows:

$$CLK_1 = CLK_0 + \psi_1$$

$$CLK_2 = CLK_0 + \psi_2$$

$$CLK_3 = CLK_0 + \psi_3$$

$$\ldots$$

$$CLK_n = CLK_0 + \psi_n$$

$\psi_1, \psi_2, \psi_3, \ldots, \psi_n$ represent clock deviations generated by the TAF-DPS due to clock delivery, and $CLK_0$ represents the ideal clock of the TAF-DPS.

Figure 4:
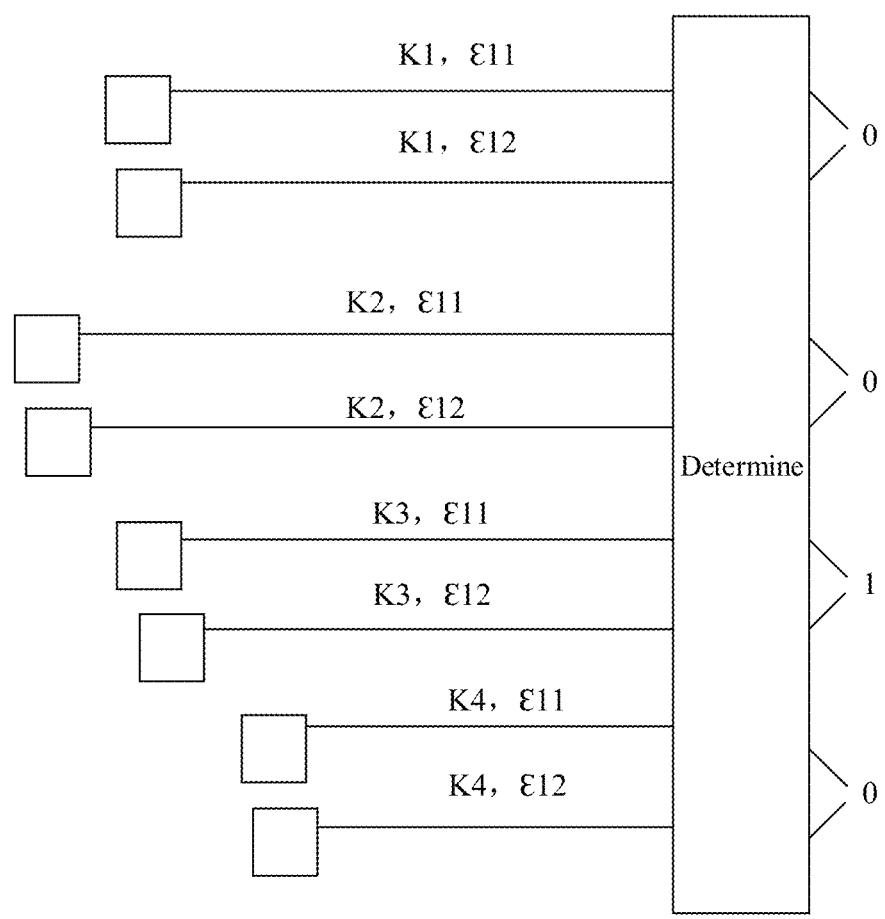
FIG. 4 is a schematic diagram of a scenario in which an artificial deviation is introduced to an interactive authentication method according to some embodiments of the present disclosure.

In the present disclosure, a bias is artificially introduced to generate unique chip fingerprints. The error of the conventional TDP circuit comes from a bias in the manufacturing process, and thus the TDP circuit becomes a biased TDP when the bias is artificially introduced. Because the magnitude of the bias artificially introduced is much greater than that of the bias in the manufacturing process, the nature of the biased TDP is ensured to be consistent, that is, the same response is generated in response to the same challenge being input. The biased TDP is referred to as a BTDP. Referring to FIG. 4, artificially introducing the bias refers to controlling delays of the TDP lines within a corresponding range of difference, and the PUF is to design two lines to be the same and then introduce the bias during manufacture. The symmetric protocol in the symmetric BDTP circuit of the present disclosure is a biased-based TAF-DPS-PUF. That is, the bias is transferred to the design stage, and thus the delays of the two lines are different in the design stage. For example, taking $\varepsilon_{11}$ and $\varepsilon_{12}$ illustrated in FIG. 1 as examples, 0 is produced in the case that the delay of $\varepsilon_{11}$ is designed larger, and 1 is produced in the case that the delay of $\varepsilon_{11}$ is designed smaller.

It should be understood that the circuits of the transmitter and the receiver in the interactive authentication method according to the present disclosure include the TAF-DPS and the PUF (the BTDP circuit) with bias of the same specification.

Figure 5:
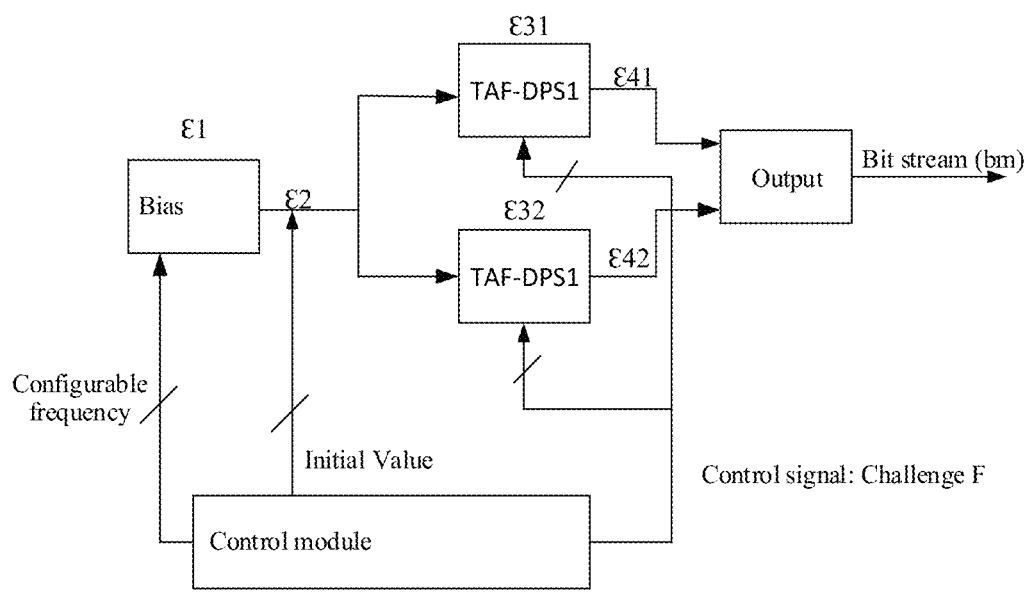
FIG. 5 is an architecture schematic diagram of a TAF-DPS-PUF digital fingerprint generator circuit of some embodiments of the present disclosure.

The present disclosure is an interactive authentication method based on the biased TAF-DPS-PUF (TDP). The circuit diagram of the TAF-DPS-PUF is illustrated in FIG. 5.

A clock period of TAF-DPS1 is expressed as follows:

$$T_{DPS1} = \varepsilon_{x+F} - \varepsilon_x$$

A clock period of TAF-DPS2 is expressed as follows:

$$T_{DPS2} = \varepsilon'_{x+F} - \varepsilon'_x$$

$\varepsilon_x = \varepsilon_{2x} + \varepsilon_{3x} + \varepsilon_{4x}$. $T_{DPS1}$ and $T_{DPS2}$ are consistent at the design state, but the bias in the manufacturing process is introduced during manufacturing, such that $T_{DPS1}$ is different from $T_{DPS2}$. Therefore, it is defined that:

In the case that $\Delta T = T_{DPS2} - T_{DPS1} \geq 0$ is satisfied, the circuit DFF outputs a fixed value bm=1.

In the case that $\Delta T = T_{DPS2} - T_{DPS1} < 0$ is satisfied, the circuit DFF outputs a fixed value bm=0.

By combining a series of $\Delta T$, a fixed sequence of 0/1 is acquired. The sequence is the digital fingerprint of the chip. For example, in the case that the sequence is 1010100, then 1010100 is the digital fingerprint. In some embodiments of the present disclosure, the digital fingerprint refers to the identity authentication key and authentication information of the present disclosure.

The interactive authentication method according to the embodiments of the present disclosure is described hereinafter with reference to specific embodiments. The implementation system corresponding to the interactive authentication method according to the embodiments of the present disclosure refers to a multi-party interactive process, and therefore, for the convenience of illustration, the interactive authentication method is first described on a transmitter.

Figure 6:
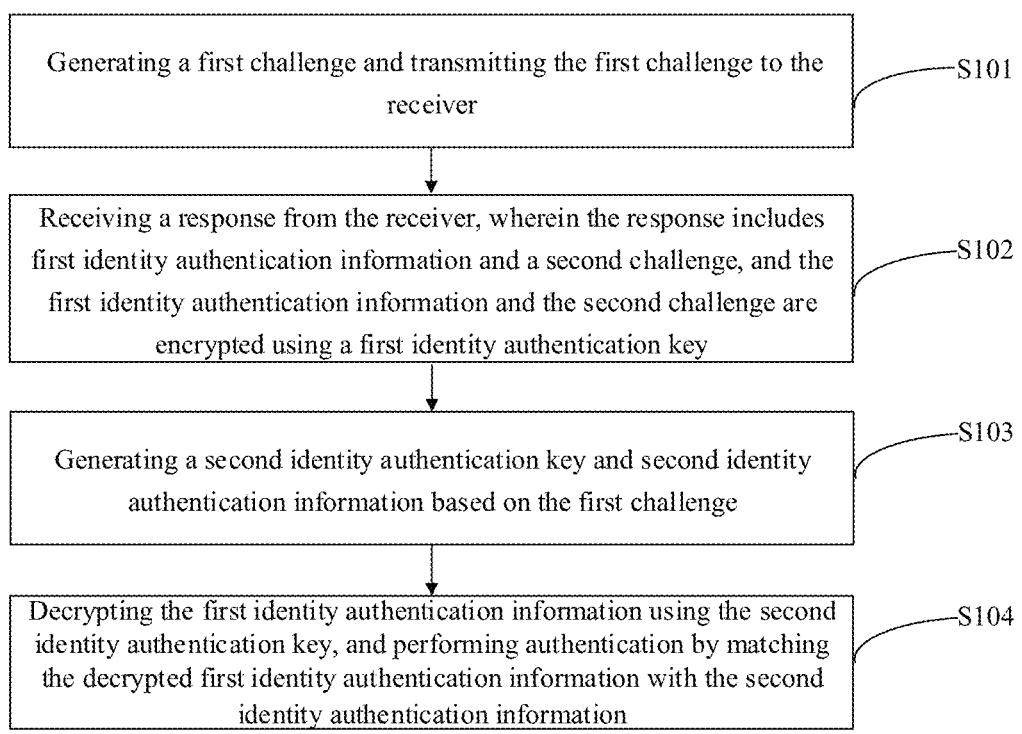
FIG. 6 is a flowchart of an interactive authentication method of some embodiments of the present disclosure.
Figure 7:
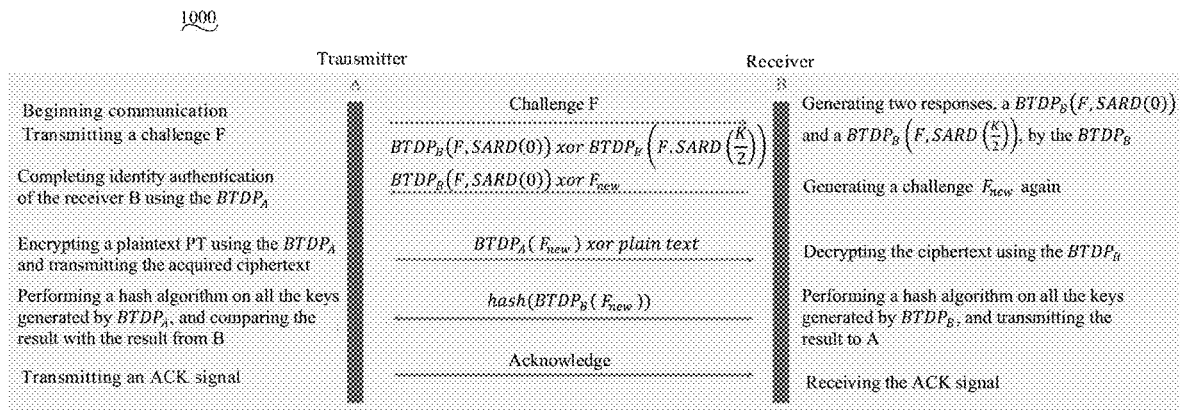
FIG. 7 is a schematic structural diagram of an interactive authentication system of some embodiments of the present disclosure.

Specifically, FIG. 6 is an exemplary flowchart of an interactive authentication method on a transmitter side, wherein the transmitter is communicatively connected to a receiver (as illustrated in FIG. 7). The interactive authentication method includes the following steps.

In S101, a first challenge is generated and transmitted to the receiver.

In S102, a response from the receiver is received, wherein the response includes first identity authentication information and a second challenge. The first identity authentication information and the second challenge are encrypted using a first identity authentication key.

In S103, a second identity authentication key and second identity authentication information are generated based on the first challenge.

In S104, the first identity authentication information is decrypted using the second identity authentication key, and authentication is performed by matching the decrypted first identity authentication information with the second identity authentication information.

Specifically, referring to FIG. 7, according to the interactive authentication method of the present disclosure, the first challenge F is first generated by the transmitter and is transmitted to the receiver. The first challenge F is control word information, for example, a specific value of F is: F=108 or F=384. The transmitter refers to a terminal A, and the receiver refers to a terminal B. The communication is started from the terminal A. The terminal A randomly generates the first challenge F, encrypts the first challenge F, and transmits the encrypted first challenge F to the terminal B. The subsequent embodiments of the present disclosure are described based on the transmitter A and the receiver B.

Upon receiving the first challenge F from the transmitter A, the receiver B generates a corresponding response based on the first challenge F. The response includes the first identity authentication key and the first identity authentication information. $BTDP_B(F, SARD(0))$ represents the first identity authentication key for identity authentication, and $$BTDP_B\left(F, SARD\left(\frac{K}{2}\right)\right)$$

represents the ID for the identity authentication, that is, the first identity authentication information. At the same time, the receiver B generates a new second challenge $F_{new}$. The second challenge $F_{new}$ is the same as the first challenge F. The second challenge $F_{new}$ is generated by intercepting numbers in the response, generated based on the first challenge F, according to a predefined protocol relation between the transmitter A and the receiver B. For example, the first challenge F is 308, and the numbers in the response generated based on the first challenge F is 12344308. In the case that the predefined protocol relation between the transmitter A and the receiver B specifies intercepting the last three numbers in the response, the acquired second challenge $F_{new}$ is the same as the first challenge F, 308. It should be noted that both the first challenge F and the second challenge $F_{new}$ being 308 is only a simple example for the purpose of explaining the interactive authentication method of the present disclosure, and the first challenge F and the second challenge $F_{new}$ are other more complex numbers in practice, which are not limited herein.

It should be understood that the BTDP is considered as a function y=f(x), wherein the working mechanism of the BTDP is the same as that of the PUF. The new challenge means giving a new value to x, such as x=x0, and then y0=f(x0) is acquired. In this case, y0 is the response.

Then, the first identity authentication information $$BTDP_B\left(F, SARD\left(\frac{K}{2}\right)\right)$$

and the second challenge $F_{new}$ are encrypted in the receiver B based on the first identity authentication key $BTDP_B(F, SARD(0))$. This encryption method is simple and highly secure. The encrypted ID and the new second challenge $F_{new}$ are transmitted to the transmitter A.

It should be understood that the ID needs to be encrypted. An unencrypted ID tends to be stolen during the transmission. The ID is encrypted using a key based on stream encryption. However, in addition to the stream encryption, the ID herein may also be encrypted in other encryption methods, which is not limited herein.

Specifically, by the stream encryption method, the encrypted first identity authentication information is acquired by an exclusive OR (XOR) process on the first identity authentication information, that is, an XOR logic operation, $$BTDP_B(F, SARD(0)) xor BTDP_B\left(F, SARD\left(\frac{K}{2}\right)\right)$$

Exclusive OR (XOR) is a mathematical operator, which is applied to logical operations. The mathematical symbol of XOR is "⊕" and the computer symbol is "XOR." The algorithm is a⊕b. In the case that two values of a and b are different, a result of XOR is 1; and in the case that the two values of a and b are consistent, the result of the XOR is 0. XOR is also referred to as a half add operation, wherein the algorithm is equivalent to binary addition without carry. In binary, 1 means true and 0 means false. Thus, the algorithm of XOR is 0⊕0=0, 1⊕0=1, 0⊕1=1, and 1⊕1=0 (the same is 0, and the difference is 1). For example, in the binary format, the first identity authentication information (ID) is represented as 101001 and the first identity authentication key is represented as 010101. The first identity authentication key and the first identity authentication information are calculated by bits, based on the XOR logical operation, by the second identity authentication information (ID) encrypted based on the first identity authentication key 010101. Then the encrypted first identity authentication information (ID) is acquired to be 11100.

It should be noted that the logical operation of the first identity authentication information is not limited to the XOR logical operation, and is performed in other ways, such as "AND" and "NOT" operations, which is not limited herein.

It should be noted that the transmitter A is capable of generating, based on the first challenge F, the second identity authentication key and the second identity authentication information. That is, the second identity authentication key and the second identity authentication information refer to a response generated by the transmitter A based on the first challenge F. Then, the transmitter A decrypts the first identity authentication information using the second identity authentication key and performs the identity authentication by matching the decrypted first identity authentication information with the second identity authentication information generated by itself.

Figure 8:
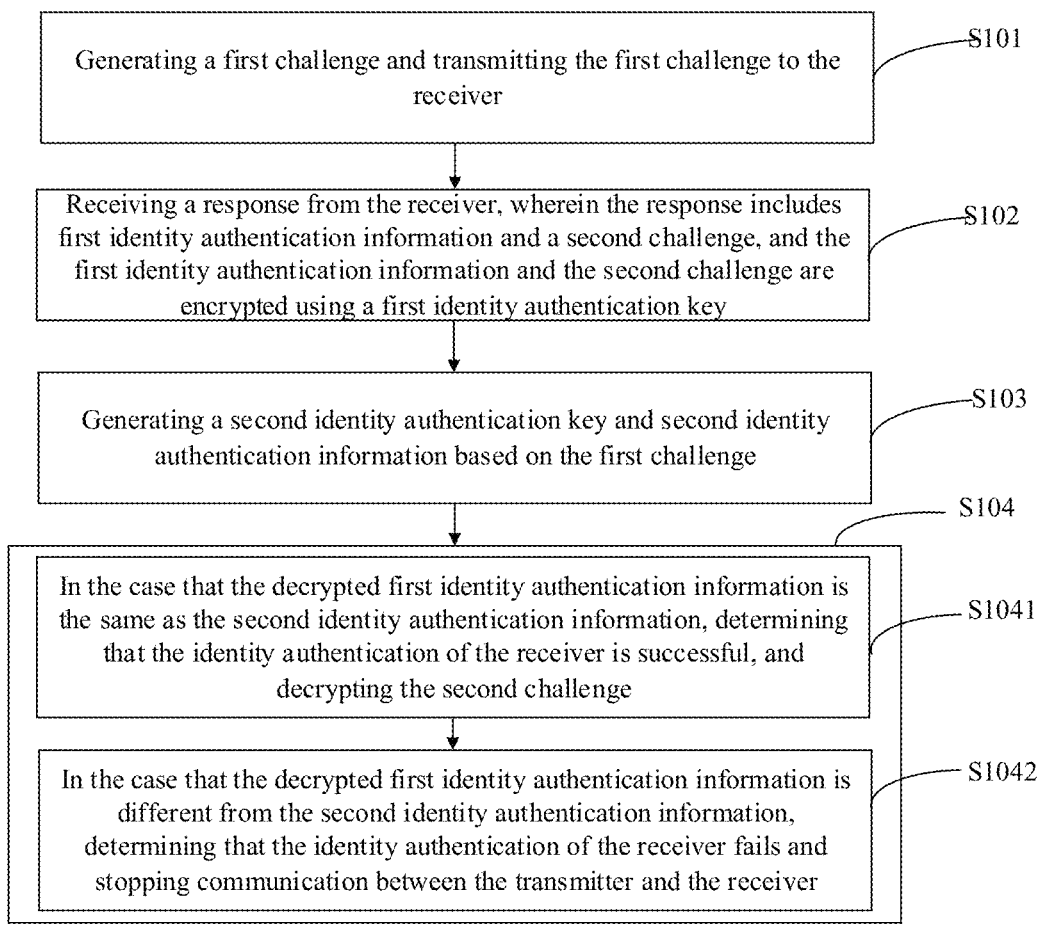
FIG. 8 is a flowchart of an interactive authentication method of some embodiments of the present disclosure.

Referring to FIG. 8, decrypting the first identity authentication information using the second identity authentication key and performing the identity authentication by matching the decrypted first identity authentication information with the second identity authentication information (i.e., step 104) includes the following steps.

In S1041, in the case that the decrypted first identity authentication information is the same as the second identity authentication information, it is determined that the identity authentication of the receiver is successful, and the second challenge is decrypted.

In S1042, in the case that the decrypted first identity authentication information is different from the second identity authentication information, it is determined that the identity authentication of the receiver fails and communication between the transmitter and the receiver is stopped.

Figure 9:
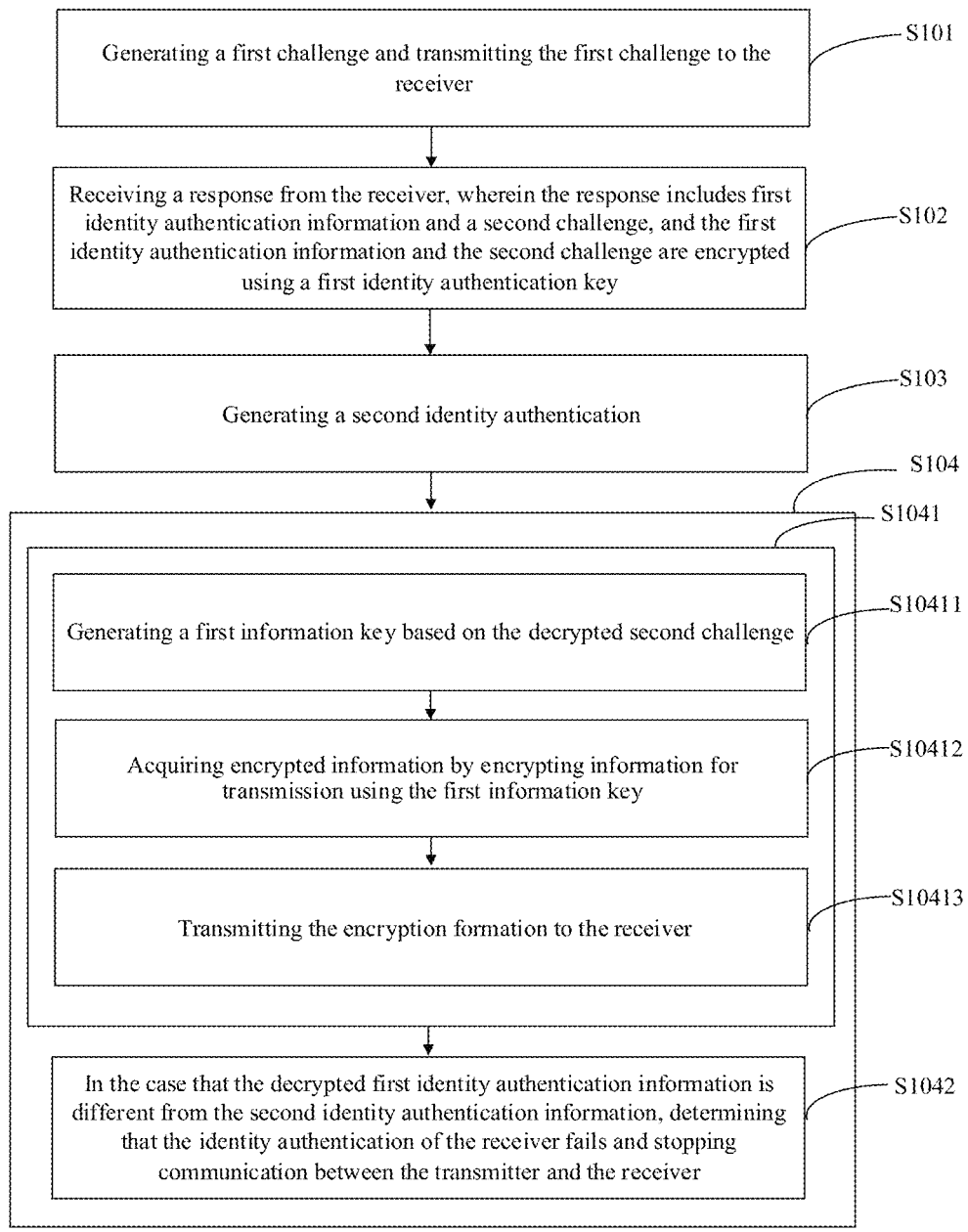
FIG. 9 is a flowchart of an interactive authentication method of some embodiments of the present disclosure.

In detail, referring to FIG. 9, the transmitter A receives the first identity authentication information $$BTDP_B\left(F, SARD\left(\frac{K}{2}\right)\right)$$

from the receiver B, and generates the second identity authentication key $BTDP_A(F, SARD(0))$ and the second identity authentication information $$BTDP_A\left(F, SARD\left(\frac{K}{2}\right)\right)$$

by the first challenge F using its own BTDPA. In this case, the transmitter A decrypts the ID information $$BTDP_B\left(F, SARD\left(\frac{K}{2}\right)\right)$$

of the receiver B and compares the decrypted first identity authentication information $$BTDP_B\left(F, SARD\left(\frac{K}{2}\right)\right)$$

with the second identity authentication information $$BTDP_A\left(F, SARD\left(\frac{K}{2}\right)\right)$$

generated by the transmitter A itself. In the case that the two information is consistent, the identity authentication of the receiver B is completed. In the case that the two are different, the communication is stopped.

It should be noted that, the first identity authentication information $$BTDP_B\left(F, SARD\left(\frac{K}{2}\right)\right)$$

and the second identity authentication information $$BTDP_A\left(F, SARD\left(\frac{K}{2}\right)\right)$$

are both responses generated based on the first challenge F. Therefore, in the case that the first identity authentication information is the same as the second identity authentication information, the transmitter A and the receiver B have the same identity and the identity authentication is successful. In the case that the first identity authentication information is different from the second identity authentication information, the first identity authentication key is incorrect, or the first identity authentication information is incorrect, and the identities of the transmitter A and the receiver B are not consistent, and thus the identity authentication is not successful. In this case, the communication between the transmitter A and the receiver B is stopped.

In some embodiments, the first identity authentication key $BTDP_B(F, SARD(0))$ and the first identity authentication information $$BTDP_B\left(F, SARD\left(\frac{K}{2}\right)\right)$$

are generated by the receiver B based on the first challenge F using a first encryption circuit $BTDP_B$ which employs the biased TAF-DPS and the PUF (as illustrated in FIG. 5).

In some embodiments, the second identity authentication key $BTDP_A(F, SARD(0))$ and the second identity authentication information $$BTDP_A\left(F, SARD\left(\frac{K}{2}\right)\right)$$

are generated by the transmitter A based on the first challenge F using a second encryption circuit $BTDP_A$ which employs the biased TAF-DPS) and the PUF. The properties of the first encryption circuit $BTDP_B$ and the second encryption circuit $BTDP_A$ are consistent. That is, the same challenge is input, and the same response is generated, such that the encryption and decryption of the transmitter A and the receiver B are in the same way.

Referring to FIG. 9, in some embodiments, in the case that the decrypted first identity authentication information is the same as the second identity authentication information, determining that the identity authentication of the receiver is successful and decrypting the second challenge (step S1041) includes the following steps.

In S10411, a first information key is generated based on the decrypted second challenge.

In S10412, encrypted information is acquired by encrypting information for transmission using the first information key.

In S10413, the encryption formation is transmitted to the receiver.

Specifically, in the case that the identity authentication of the receiver B is successful, the transmitter A decodes the second challenge $F_{new}$. The transmitter A generates a series of first information keys $K_A=BTDP_A(F_{new})$ using the second challenge $F_{new}$. Then, the transmitter A acquires a ciphertext $CT=K_A \oplus PT$ by encrypting a plaintext PT using the first information key $K_A=BTDP_A(F_{new})$. The plaintext PT is the content of the information that the transmitter A wants to transmit to the receiver B. The transmitter A transmits the ciphertext CT to the receiver B. Subsequently, the receiver B acquires a plaintext PTB by decrypting the received ciphertext CT using the second information key $K_B=BTDP_B(F_{new})$ generated by the second challenge $F_{new}$ itself.

In some embodiments, acquiring the encrypted information by encrypting the information for transmission using the first information key includes: encrypting the information for transmission using the first information key according to a logical operation by means of stream encryption. The logical operation is the XOR operation.

In detail, the encryption and decryption are both performed in a stream encryption (bit encryption) fashion, that is, encrypted by bits. In other embodiments of the present disclosure, other encryption methods are also employed, which are not limited herein. All embodiments of the present disclosure use XOR encryption and decryption, and the encryption process and the decryption process are the same as follows.

The encryption process: y=x XOR k

The decryption process: x=y XOR k=(x XOR k) XOR k=x y represents a ciphertext, x represents an original text, and k represents a key.

It should be noted that logical operation herein is not limited to the XOR logical operation, and is performed in other ways, such as "and" and "not" operations, which is not limited herein.

The interactive authentication method of the present disclosure integrates data encryption and identity verification into one method. The complexity of the key is increased by the stream encryption (bit encryption) method, which poses a great challenge to external attackers to attack the system. Symmetric BDTP circuits provide pathways to authentication for two terminals. The two terminals have the same circuit, that is, have the same ID, and the identity authentication process is simply completed by challenge response pairs.

Figure 10:
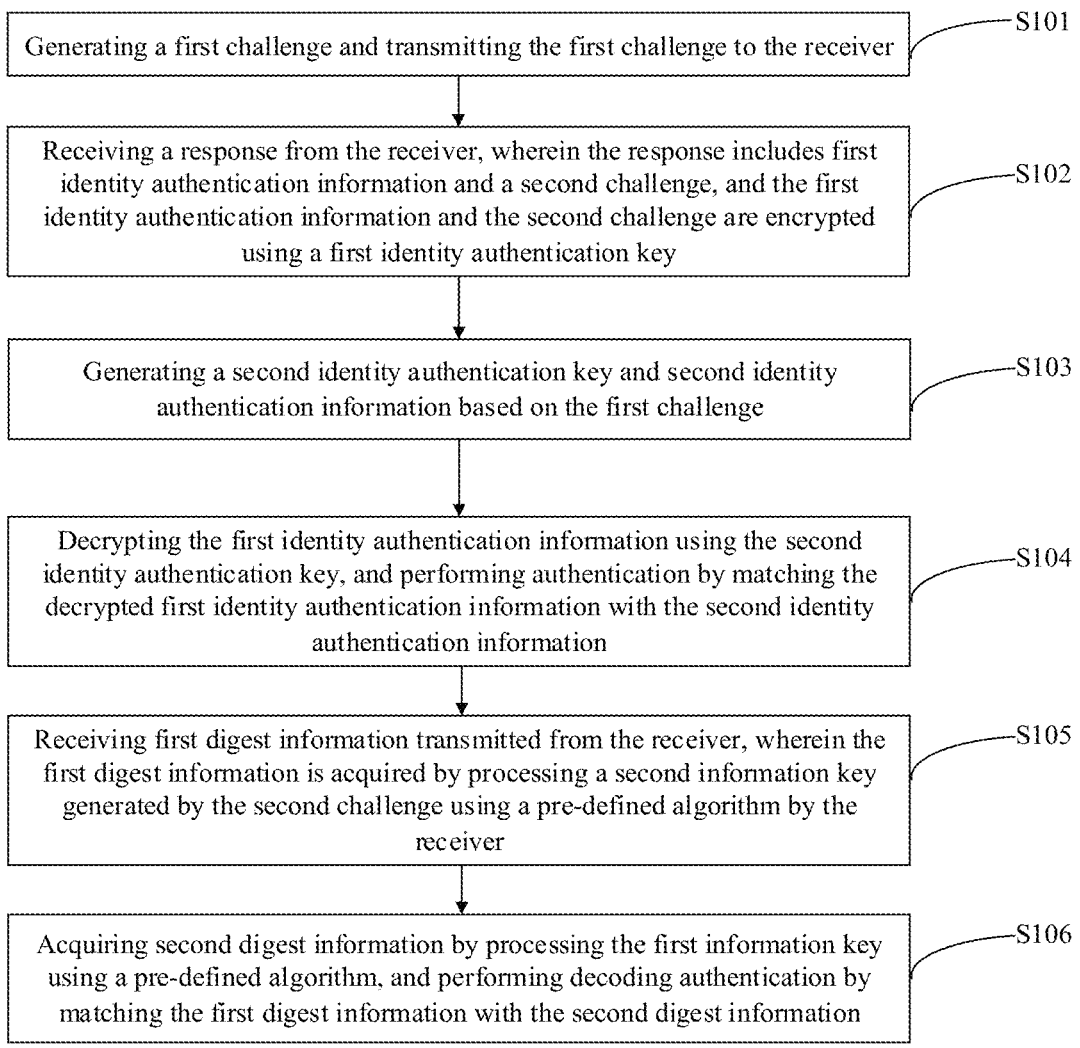
FIG. 10 is a flowchart of an interactive authentication method of some embodiments of the present disclosure.

Referring to FIG. 10, in some embodiments, the interactive authentication method further includes the following steps.

In S105, first digest information transmitted from the receiver is received. The first digest information is acquired by processing a second information key generated by the second challenge using a pre-defined algorithm by the receiver.

In S106, second digest information is acquired by processing the first information key using a pre-defined algorithm, and decoding authentication is performed by matching the first digest information with the second digest information.

Figure 11:
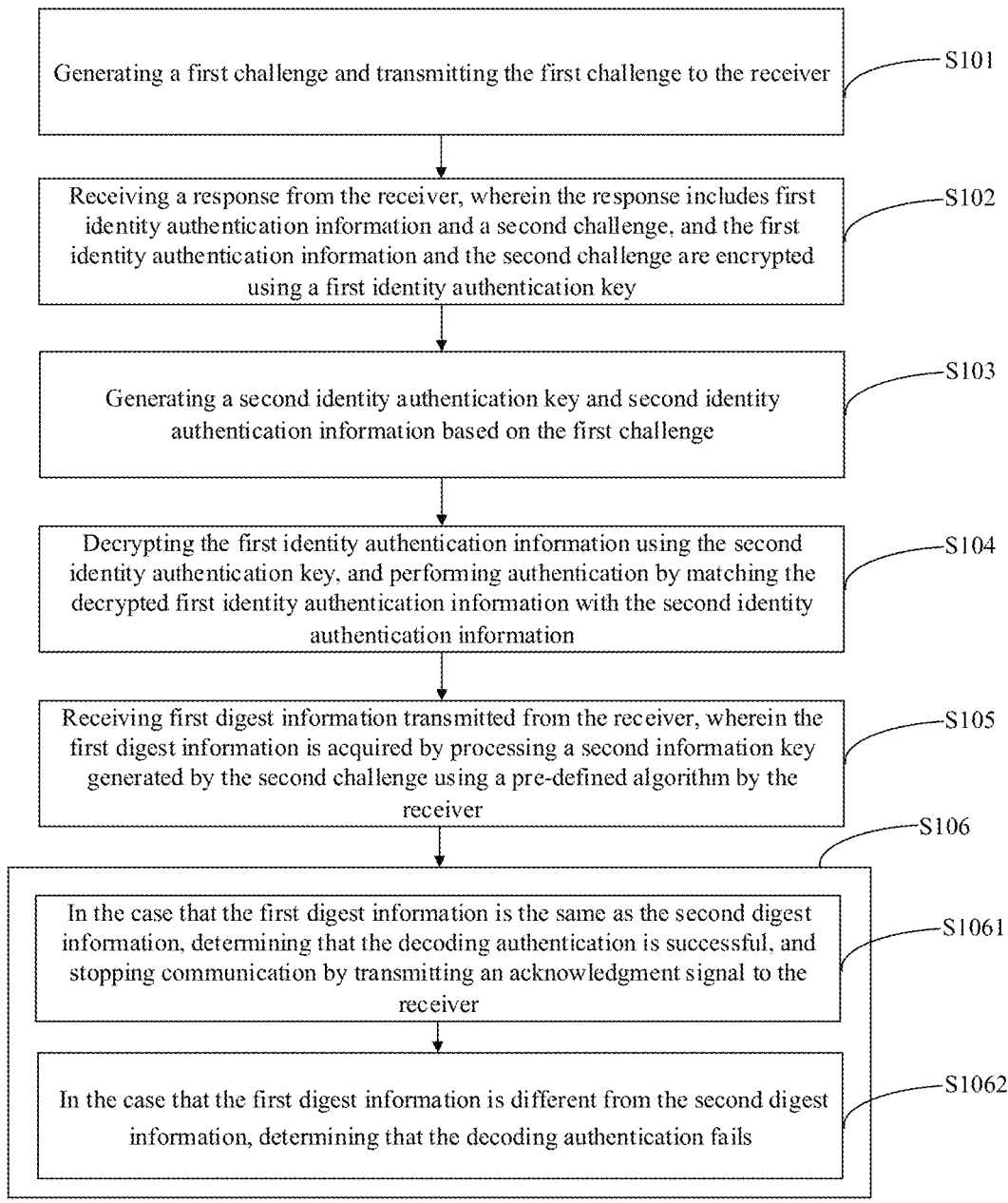
FIG. 11 is a flowchart of an interactive authentication method of some embodiments of the present disclosure.

Referring to FIG. 11, step S106 further includes the following steps.

In S1061, in the case that the first digest information is the same as the second digest information, the decoding authentication is determined to be successful, and communication is stopped by transmitting an acknowledgment signal to the receiver.

In S1062, in the case that the first digest information is different from the second digest information, it is determined that the decoding authentication fails.

Specifically, the pre-defined algorithm is a hash algorithm or other algorithms that implement the reduction of the first information key to the second digest information and the reduction of the second information key to the first digest information. In the embodiments of the present disclosure, the description is given using a scenario where the pre-defined algorithm is the hash algorithm as an example. Referring to FIG. 7, the receiver B reduces all the second information keys $K_B$ to the first digest information hash $(K_B)$ by the hash algorithm and transmits the first digest information hash $(K_B)$ to the transmitter A. The transmitter A reduces all the first information keys $K_A$ to the second digest information hash $(K_A)$ by the hash algorithm, and compares the second digest information hash $(K_A)$ with the first digest information hash $(K_B)$ transmitted from the receiver B. In the case that the second digest information hash $(K_A)$ is the same as the first digest information hash $(K_B)$, the decoding is determined to be correct, and in the case that they are different, the decoding is determined to be incorrect.

In some embodiments, in the case that the decoding authentication is successful by the hash algorithm, the transmitter A transmits the acknowledgment signal to the receiver B. The acknowledgment signal is an ACK signal, which indicates that the whole communication process is completed correctly and the communication ends. Under the prerequisite that the decoding is erroneous, in the case that the digest information is not transmitted completely, or the transmission process fails, the receiver B is controlled to retransmit the first digest information, and the retransmitted first digest information is compared with the second digest information again to identify whether the decoding is correct.

In summary, in the interactive authentication method according to the present disclosure, symmetric keys are first generated automatically through symmetric BTDP circuits without transmitting keys, which effectively addresses the problem that how to transmit keys during stream encryption where lengths of the key and the original text are the same. Secondly, there is a risk that IDs and keys stored in the non-volatile storage medium are stolen. In the interactive authentication method of the present disclosure, only when the BTDP circuit is in operation, the corresponding keys and the IDs are generated without being stored, which increases the difficulty in cracking. In addition, in the interactive authentication method of the present disclosure, the identity authentication and data transmission are completed through one circuit, which increases the reusability of the circuit, and reduces the overall overhead of the interactive authentication system.

The interactive authentication method according to the embodiments of the present disclosure is described hereinafter on the receiver side.

Figure 12:
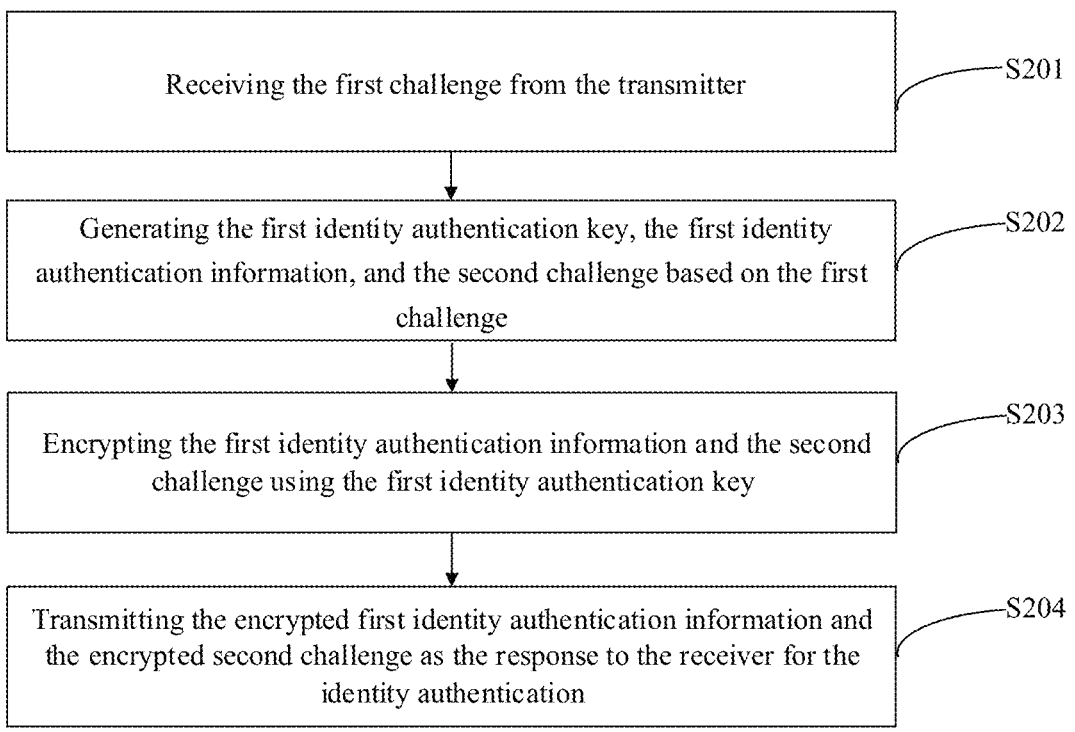
FIG. 12 is a flowchart of an interactive authentication method of some embodiments of the present disclosure.

Specifically, FIG. 12 is an exemplary flowchart of an interactive authentication method on the receiver B, wherein the receiver B is communicatively connected to the transmitter A (as illustrated in FIG. 7). The method includes the following steps.

In S201, the first challenge from the transmitter is received.

In S202, the first identity authentication key, the first identity authentication information, and the second challenge are generated based on the first challenge;

In S203, the first identity authentication information and the second challenge are encrypted using the first identity authentication key In S204, the encrypted first identity authentication information and the encrypted second challenge are transmitted as the response to the transmitter for the identity authentication.

Specifically, upon receiving the first challenge F from the transmitter A, the receiver B generates a corresponding response based on the first challenge F. The response includes $BTDP_B(F, SARD(0))$ and $$BTDP_B\left(F, SARD\left(\frac{K}{2}\right)\right).$$

$BTDP_B(F, SARD(0))$ is used as the first identity authentication key of the identity authentication, and $$BTDP_B\left(F, SARD\left(\frac{K}{2}\right)\right)$$

is used as the ID of the identity authentication, that is, the first identity authentication information. The new second challenge $F_{new}$ is generated. The first identity authentication information $$BTDP_B\left(F, SARD\left(\frac{K}{2}\right)\right)$$

and the second challenge $F_{new}$ are encrypted using the first identity authentication key $BTDP_B(F, SARD(0))$, and this encryption method is simple and highly secure. The encrypted ID and the encrypted new challenge are transmitted to the transmitter A.

Figure 13:
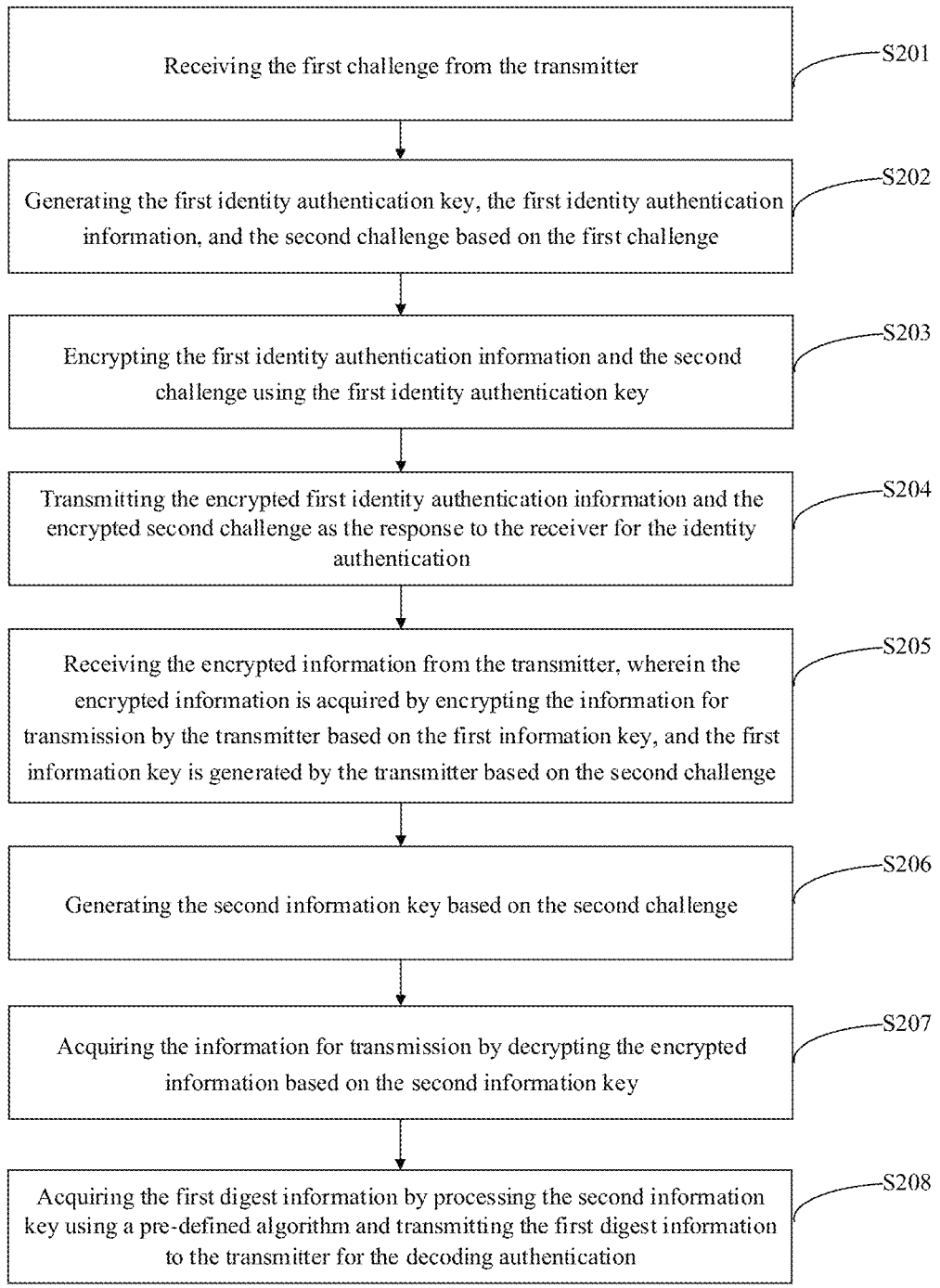
FIG. 13 is a flowchart of an interactive authentication method of some embodiments of the present disclosure.

Referring to FIG. 13, in some embodiments, the interactive authentication method further includes the following steps.

In S205, the encrypted information from the transmitter is received. The encrypted information is acquired by encrypting the information for transmission by the transmitter based on the first information key. The first information key is generated by the transmitter based on the second challenge;

In S206, the second information key is generated based on the second challenge;

In S207, the information for transmission is acquired by decrypting the encrypted information based on the second information key.

The encrypted information is encrypted using the second information key according to a logical operation by means of stream encryption. Specifically, the logical operation is an XOR operation.

In some embodiments, the interactive authentication method further includes the following step.

In S208, the first digest information is acquired by processing the second information key using a pre-defined algorithm and the first digest information is transmitted to the transmitter for the decoding authentication.

The pre-defined algorithm is the hash algorithm or another algorithm that reduces the second information key to the first digest information.

In some embodiments, the interactive authentication method further includes stopping the communication by receiving the acknowledgment signal from the transmitter.

It should be noted that the interactive authentication method on the transmitter described above is also applicable to the receiver according to the embodiments of the present disclosure. The implementation principles of both are similar, which are not repeated herein.

In summary, in the interactive authentication method according to the present disclosure, symmetric keys are first generated automatically through symmetric BTDP circuits without transmitting keys, which effectively addresses the problem that how to transfer keys during stream encryption where lengths of the key and the original text are the same. Secondly, there is a risk of being stolen in the case that IDs and keys are stored into the non-volatile storage medium. In the interactive authentication method of the present disclosure, only when the BTDP circuit is in operation, the corresponding keys and the IDs are generated without any storage, which increases the difficulty in cracking. In addition, in the interactive authentication method of the present disclosure, the identity authentication and data transmission are completed through one circuit, which increases the reusability of the circuit, and reduces the overall overhead of the interactive authentication system.

Figure 14:
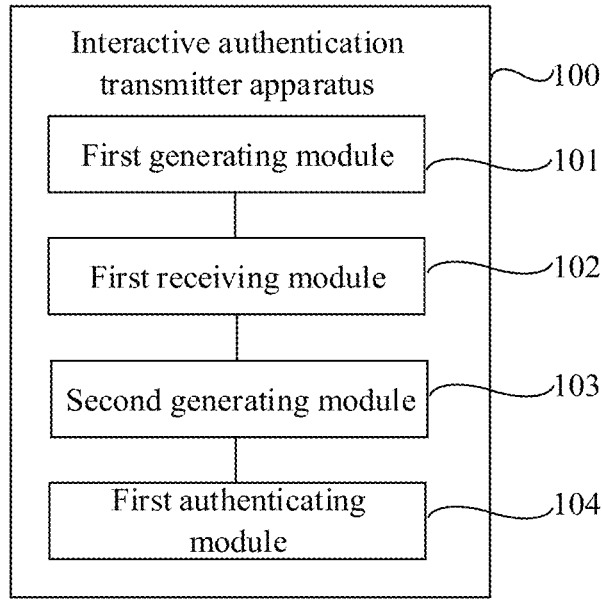
FIG. 14 is a schematic structural diagram of an interactive authentication transmitter apparatus of some embodiments of the present disclosure.

For the implementation of the above embodiments, referring to FIG. 14, the present disclosure further provides an interactive authentication transmitter apparatus 100, applicable to a transmitter, the transmitter being communicatively connected to a receiver. The interactive authentication transmitter apparatus 100 includes a first generating module 101, a first receiving module 102, a second generating module 103, and a first authenticating module 104.

The first generating module 101 is configured to generate a first challenge and transmit the first challenge to the receiver B.

The first receiving module 102 is configured to receive a response from the receiver B. The response includes first identity authentication information and a second challenge. The first identity authentication information and the second challenge are encrypted using a first identity authentication key.

The second generating module 103 is configured to generate, based on the first challenge, a second identity authentication key and second identity authentication information.

The first authenticating module 104 is configured to decrypt the first identity authentication information using the second identity authentication key and perform authentication by matching the decrypted first identity authentication information with the second identity authentication information.

It should be noted that the interactive authentication method on the transmitter described above is also applicable to the interactive authentication transmitter apparatus 100 of the transmitter according to the embodiments of the present disclosure. The implementation principles of both are similar, which are not repeated herein.

In summary, in the interactive authentication transmitter apparatus 100 according to the present disclosure, the identity authentication process is completed by challenge response pairs, and the identity authentication and data encryption are integrated. Both the keys and IDs are generated by hardware TDP. The ID generated by hardware is related to the hardware, is only generated upon power-up and operation, and is non-migratable. Therefore, the ID has the advantages of high uniqueness, privacy, and security, and does not need to be stored, such that the security of the system is greatly improved.

Figure 15:
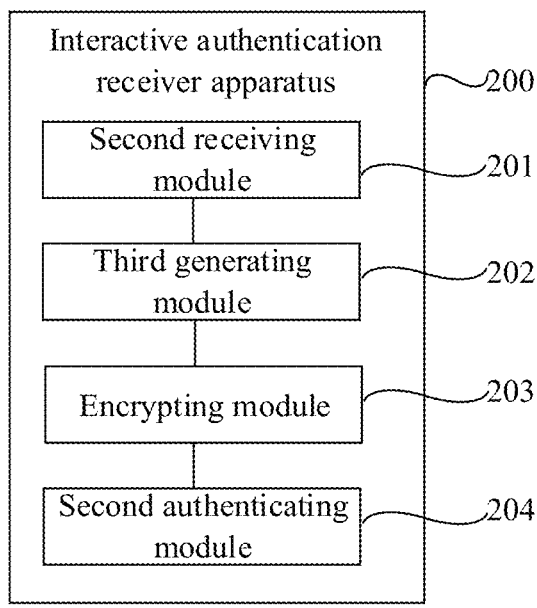
FIG. 15 is a schematic structural diagram of an interactive authentication receiver apparatus of some embodiments of the present disclosure.

For the implementation of the above embodiments, referring to FIG. 15, the present disclosure further provides an interactive authentication receiver apparatus 200, applicable to a receiver, the receiver being communicatively connected to a transmitter. The interactive authentication transmitter apparatus 200 includes a second receiving module 201, a third generating module 202, an encrypting module 203, and a second authenticating module 204.

The second receiving module 201 is configured to receive a first challenge from the transmitter.

The third generating module 202 is configured to generate, based on the first challenge, a first identity authentication key, first identity authentication information, and a second challenge.

The encrypting module 203 is configured to encrypt, using the first identity authentication key, the first identity authentication information and the second challenge.

The second authenticating module 204 is configured to transmit the encrypted first identity authentication information and the encrypted second challenge as a response to the transmitter for identity authentication.

It should be noted that the interactive authentication method on the receiver described above is also applicable to the interactive authentication receiver apparatus 200 of the receiver according to the embodiments of the present disclosure. The implementation principles of both are similar, which are not repeated herein.

In summary, in the interactive authentication receiver apparatus 200 according to the present disclosure, the identity authentication process is completed by challenge response pairs, and the identity authentication and data encryption are integrated. Both the keys and IDs are generated by hardware TDP. The ID generated by hardware is related to the hardware, is only generated upon power-up and operation, and is non-migratable. Therefore, the ID has the advantages of high uniqueness, privacy, and security, and does not need to be stored, such that the security of the system is greatly improved.

Referring to FIG. 7, the present disclosure further provides an interactive authentication system 1000. The interactive authentication system 1000 includes a transmitter A and a receiver B.

The transmitter A is configured to generate a first challenge F and transmit the first challenge to the receiver B.

The receiver B is configured to: receive the first challenge F transmitted by the transmitter A and generate, based on the first challenge F, a first identity authentication key, first identity authentication information, and a second challenge; encrypt, using the first identity authentication key, the first identity authentication information and the second challenge $F_{new}$; and transmit the encrypted first identity authentication information and the encrypted second challenge to the transmitter A as a response.

The transmitter A is configured to: generate, based on the first challenge, a second identity authentication key and second identity authentication information; decrypt the first identity authentication information using the second identity authentication key; and perform authentication by matching the decrypted first identity authentication information with the second identity authentication information.

In the interactive authentication system 1000 according to the present disclosure, the identity authentication processes of the transmitter and the receiver are completed by challenge response pairs, and the identity authentication and data encryption are integrated. Both the keys and IDs are generated by hardware TDP. The ID generated by hardware is related to the hardware, is only generated upon power-up and operation, and is non-migratable. Therefore, the ID has the advantages of high uniqueness, privacy, and security, and does not need to be stored, such that the security of the system is greatly improved. In addition, the method has characteristics such as small area, low power consumption, and easy integration, and is suitable for an FPGA chip system due to its remarkable reconfigurability.

The present disclosure further provides a computer device including a memory and a processor. One or more computer programs are stored in the memory. The one or more computer programs, when loaded and run by the processor, cause the processor to perform the interactive authentication method as described above.

The present disclosure further provides a computer-readable storage medium, storing one or more computer programs. The one or more computer programs, when loaded and run by a processor, cause the processor to perform the interactive authentication method as described above.

It should be understood by those skilled in the art that all or part of the processes in the method embodiments described above are accomplished by instructing the relevant hardware by one or more computer programs. The one or more computer programs are stored in a non-volatile computer-readable storage medium. The one or more computer programs include processes of the method embodiments described above when executed. The storage medium is a disk, an optical disk, a read-only memory (ROM), and the like.

In the present disclosure, unless expressly specified and limited otherwise, a first feature being "above" or "under" a second feature may include that the first feature is in direct contact with the second feature or may include that the first feature is not in direct contact with the second feature but in contact with the second feature through another feature between them. In addition, the first feature being "above" the second feature includes that the first feature is right above and obliquely above the second feature, or simply indicates that a horizontal height of the first feature is greater than a horizontal of the second feature. The first feature being "below" the second feature includes that the first feature is right below and obliquely below the second feature, or simply indicates that a horizontal height of the first feature is smaller than a horizontal of the second feature.

A plurality of different embodiments or examples are provided by the present disclosure described above for implementing different structures of the present disclosure. To simplify the present disclosure, the components and arrangements of particular examples are described above. They are, of course, examples only and are not intended to limit the present disclosure. In addition, the present disclosure may repeat reference numerals and/or reference letters in different examples. Such repetition is for the purpose of simplicity and clarity and is not in itself indicative of a relationship between the discussed various embodiments and/or arrangements. In addition, various examples of specific processes and materials are provided in the present disclosure, but those skilled in the art can be aware of applications of other processes and/or utilization of other materials.

In the description of the specification, the terms "an embodiment," "some embodiments," "a schematic embodiment," "an example," "a specific example," or "some examples" indicate that the specific features, structures, materials, or characteristics described in conjunction with the embodiments or examples are included in at least one embodiment or example of the present disclosure. In the specification, the schematic description for the above terms does not necessarily refer to the same embodiment or example. Further, the specific features, structures, materials, or characteristics described may be combined in any one or more of the embodiments or examples in a suitable manner.

Although embodiments of the present disclosure have been illustrated and described, it should be understood by those skilled in the art that a variety of variations, modifications, substitutions, and variants of these embodiments may be made without departing from the principles and purposes of the present disclosure. The scope of the present disclosure is limited by the claims and their equivalents.

What is claimed is:

1. An interactive authentication method, applicable to a transmitter, the transmitter being communicatively connected to a receiver,
   the authentication method comprising:
   generating a first challenge and transmitting the first challenge to the receiver;
   receiving a response from the receiver, wherein the response comprises first identity authentication information and a second challenge, the first identity authentication information and the second challenge being encrypted using a first identity authentication key;
   generating, based on the first challenge, a second identity authentication key and second identity authentication information; and
   decrypting the first identity authentication information using the second identity authentication key, and performing identity authentication by matching the decrypted first identity authentication information with the second identity authentication information;
   wherein the first identity authentication key and the first identity authentication information are generated by the receiver based on the first challenge using a first encryption circuit which employs a biased time-average-frequency direct period synthesis and a physical unclonable function, and the second identity authentication key and the second identity authentication information are generated by the transmitter based on the first challenge using a second identity encryption circuit which employs a biased time-average-frequency direct period synthesis and a physical unclonable function, properties of the first encryption circuit and the second encryption circuit being maintained consistent.

2. The interactive authentication method according to claim 1, wherein decrypting the first identity authentication information using the second identity authentication key and performing the identity authentication by matching the decrypted first identity authentication information with the second identity authentication information comprises:
   in response to the decrypted first identity authentication information being the same as the second identity authentication information, determining that the identity authentication of the receiver is successful and decrypting the second challenge; or
   in response to the decrypted first identity authentication information being different from the second identity authentication information, determining that the identity authentication of the receiver fails and stopping communication between the transmitter and the receiver.

3. The interactive authentication method according to claim 2,
   wherein determining that the identity authentication of the receiver is successful and decrypting the second challenge in response to the decrypted first identity authentication information being the same as the second identity authentication information comprises:
   generating a first information key based on the decrypted second challenge;
   acquiring encrypted information by encrypting information for transmission using the first information key; and
   transmitting the encrypted information to the receiver.

4. The interactive authentication method according to claim 3, wherein acquiring the encrypted information by encrypting the information for transmission using the first information key comprises:
  encrypting the information for transmission using the first information key according to a logical operation by means of stream encryption.

5. The interactive authentication method according to claim 3, further comprising:
  receiving first digest information from the receiver, wherein the first digest information is acquired by processing a second information key generated by the second challenge using a pre-defined algorithm by the receiver; and
  acquiring second digest information by processing the first information key using a pre-defined algorithm and performing decoding authentication by matching the first digest information with the second digest information.

6. The interactive authentication method according to claim 5, wherein performing the decoding authentication by matching the first digest information with the second digest information comprises:
  in response to the first digest information being the same as and the second digest information, determining that the decoding authentication is successful and stopping communication by transmitting an acknowledgment signal to the receiver; or
  in response to the first digest information being different from the second digest information, determining that decoding authentication fails.

7. A computer device, comprising a processor and a memory, wherein the memory stores one or more computer programs; wherein
  the one or more computer programs, when loaded and run by the processor, cause the processor to perform the method as defined in claim 1.

8. The computer device according to claim 7, wherein the one or more computer programs, when loaded and run by the processor, cause the processor to perform:
  in response to the decrypted first identity authentication information being the same as the second identity authentication information, determining that the identity authentication of the receiver is successful and decrypting the second challenge; or
  in response to the decrypted first identity authentication information being different from the second identity authentication information, determining that the identity authentication of the receiver fails and stopping communication between the transmitter and the receiver.

9. The computer device according to claim 8, wherein the one or more computer programs, when loaded and run by the processor, cause the processor to perform:
  generating a first information key based on the decrypted second challenge;
  acquiring encrypted information by encrypting information for transmission using the first information key; and
  transmitting the encrypted information to the receiver.

10. A non-volatile computer-readable storage medium, storing one or more computer programs; wherein
  the one or more computer programs, when loaded and run by one or more processors, cause then one or more processors to perform the method as defined in claim 1.

11. An interactive authentication method, applicable to a receiver, the receiver being communicatively connected to a transmitter,
  the authentication method comprising:
  receiving a first challenge from the transmitter;
  generating, based on the first challenge, a first identity authentication key, first identity authentication information, and a second challenge;
  encrypting, using the first identity authentication key, the first identity authentication information and the second challenge; and
  transmitting the encrypted first identity authentication information and the encrypted second challenge as a response to the transmitter for identity authentication;
  wherein the first identity authentication key and the first identity authentication information are generated by the receiver based on the first challenge using a first encryption circuit which employs a biased time-average-frequency direct period synthesis and a physical unclonable function.

12. The interactive authentication method according to claim 11, further comprising:
  receiving encrypted information from the transmitter, wherein the encrypted information is acquired by the transmitter by encrypting information for transmission based on a first information key, the first information key being generated by the transmitter based on the second challenge;
  generating a second information key based on the second challenge; and
  acquiring the information for transmission by decrypting the encrypted information using the second information key.

13. The interactive authentication method according to claim 12, wherein acquiring the information for transmission by decrypting the encrypted information using the second information key comprises:
  encrypting the information for transmission using the second information key according to a logical operation by means of stream encryption.

14. The interactive authentication method according to claim 11, further comprising:
  acquiring first digest information by processing the second information key using a pre-defined algorithm, and transmitting the first digest information to the transmitter for decoding authentication.

15. The interactive authentication method according to claim 11, further comprising:
  stopping communication by receiving an acknowledgment signal from the transmitter.

16. An interactive authentication system, comprising: a transmitter and a receiver; wherein the transmitter is configured to generate a first challenge and transmit the first challenge to the receiver;
  the receiver is configured to receive the first challenge transmitted by the transmitter; generate, based on the first challenge, a first identity authentication key, first identity authentication information, and a second challenge; encrypt, using the first identity authentication key, the first identity authentication information and the second challenge; and transmit the encrypted first identity authentication information and the encrypted second challenge as a response to the transmitter; and
  the transmitter is further configured to generate, based on the first challenge, a second identity authentication key and second identity authentication information; decrypt the first identity authentication information using the second identity authentication key; and perform identity authentication by matching the decrypted first identity authentication information with the second identity authentication information;

wherein the first identity authentication key and the first identity authentication information are generated by the receiver based on the first challenge using a first encryption circuit which employs a biased time-average-frequency direct period synthesis and a physical unclonable function, and the second identity authentication key and the second identity authentication information are generated by the transmitter based on the first challenge using a second identity encryption circuit which employs a biased time-average-frequency direct period synthesis and a physical unclonable function, properties of the first encryption circuit and the second encryption circuit being maintained consistent.

* * * * *